United States Patent
Bald

[15] 3,642,033
[45] Feb. 15, 1972

[54] PRESTRESSED CONCRETE PIPE WITH ANCHORS FOR TYING JOINTS

[72] Inventor: Robert E. Bald, Roseland, N.J.
[73] Assignee: Interpace Corporation, Parsippany, N.J.
[22] Filed: June 24, 1970
[21] Appl. No.: 49,470

[52] U.S. Cl...........................138/103, 138/155, 138/176, 285/288
[51] Int. Cl......................................F16l 21/00, F16l 25/00
[58] Field of Search........................138/103, 100, 155, 176; 285/288, 230, 368

[56] References Cited

UNITED STATES PATENTS

| | | | |
|---|---|---|---|
| 1,652,418 | 12/1927 | Sherrerd | 285/288 |
| 3,498,645 | 3/1970 | Kowalewski et al. | 285/230 |
| 3,038,503 | 6/1962 | Dingledy | 138/155 |

*Primary Examiner*—Samuel B. Rothberg
*Attorney*—George F. Des Marais

[57] ABSTRACT

A pipe section with a concrete core having joint-forming ends and devices for restraining bolts by which joints between connected pipes are closed and prevented from opening, the pipe core being encircled by a tensioned helical wire wrapping continuous lengthwise of the core pipe over and across the locations of anchors by which the bolt-restraining devices are mounted to the core pipe.

8 Claims, 6 Drawing Figures

PATENTED FEB 15 1972

3,642,033

INVENTOR.
ROBERT E. BALD

BY
George F. Des Marais
ATTORNEY 3,642,033

PRESTRESSED CONCRETE PIPE WITH ANCHORS FOR TYING JOINTS

This invention relates to prestressed concrete pipes and, more particularly, to the type of pipe having highly tensioned wire helically wrapped around a concrete core pipe of a pipe section and which employs devices for supporting draw bolts by which two pipes are drawn together to join them.

In a pipe section having a concrete core pipe which is circumferentially compressed by a tensioned wire wrapping it is desirable to have the wire wrapping extend from end to end of the barrel of the core pipe. But if such pipe sections are to be provided with bolts on their outsides to draw together a bell and a spigot of adjoining pipe sections, a problem arises because the supports for the bolts can interfere with the continuity of the wire wrapping beyond the supports. The termination of a wire wrapping short of bolt-supporting means effects loss in the full benefit to be derived from continuing the wire wrapping beyond each of the bolt-supporting means.

Among the objects of the invention is to provide a pipe section having a reinforced concrete core with draw bolt supporting members mounted to the core pipe and having a tensioned wire wrapping helically placed around the core pipe and continuing through the areas of attachment of the bolt-supporting members to fastening means for the wire nearer and close to the ends of the core pipe.

In its more general aspects, the invention provides in the construction of high-pressure capacity concrete sections suitable for laying a pipeline under water, a concrete core pipe circumferentially compressed by a continuous winding of tensioned wire extending from close to the mouth of a bell joint ring to the spigot joint ring at the other end of the pipe.

The above, and other objects, features and advantages of the invention will be apparent in the following detailed description of illustrative embodiments thereof which is to be read in conjunction with the accompanying drawing forming a part of this disclosure, and wherein.

Figure 1:
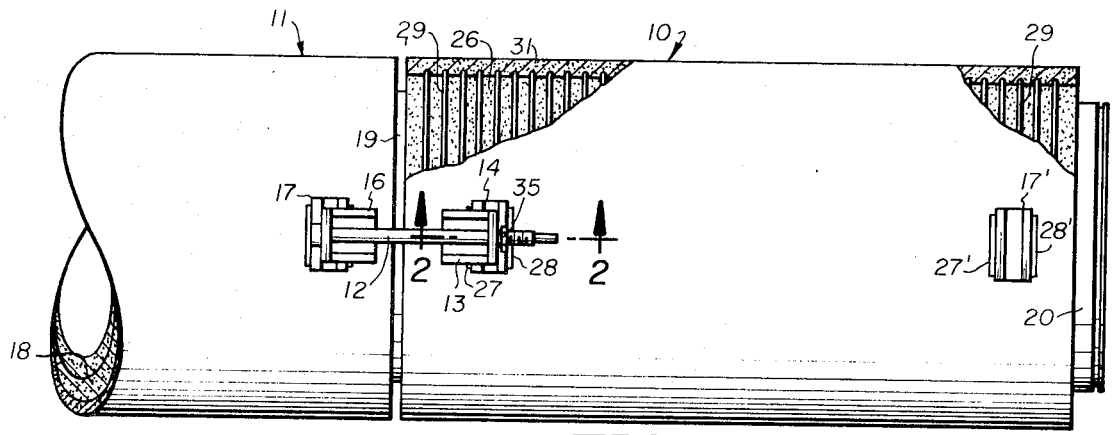
FIG. 1 illustrates two connected pipes employing the invention.

As shown in FIG. 1, the bell end of a prestressed concrete pipe section 10 is connected to the spigot end of another prestressed concrete pipe section 11. The opening of the joint between the pipe sections is restrained by a draw bolt 12 supported by a bracket 13 which is held in place on a support 14 anchored in the core pipe 15 of the pipe section 10, and by a bracket 16 which is attached to a support 17 anchored in the core pipe 18 of the pipe section 11. The pipe section 11 has a spigot joint ring 19, similar to the spigot joint ring 20 of the pipe section 10, and which is entered into a bell joint ring 21 of the pipe section 10.

Figure 2:
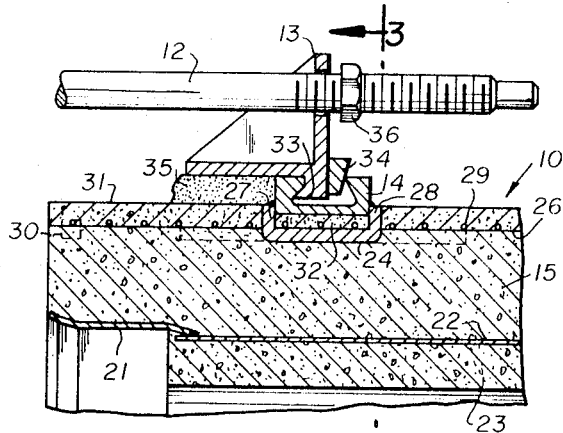
FIG. 2 is a longitudinal sectional view on line 2—2 of FIG. 1.

A core pipe may be molded or cast in any conventional manner. As shown in FIG. 2, the core pipe 15 has a water barrier in the form of a relatively thin metallic sleeve 22 which extends between and is welded to the joint rings at either end, such as the bell joint ring 21, and a complementary spigot joint ring 20, FIG. 1. The interior of the sleeve 22 is lined with concrete 23 and completes the wall thickness of the pipe.

Two or more bolts 12 may be used at a joint, but for subaqueous use two are placed diametrically opposite one another so that when the pipe sections are laid the bolts may be located at the horizontal center plane or a pipeline in order to permit flexibility of a joint. All of the supports and anchoring means for the bolts at both ends of a pipe section are generally similarly constructed.

Figure 3:
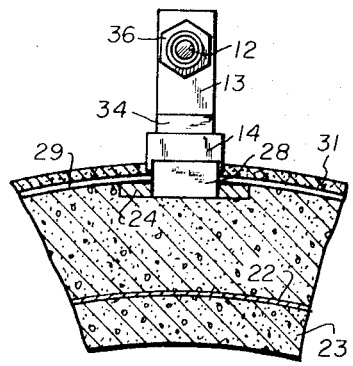
FIG. 3 is a transverse sectional view on line 3—3 of FIG. 2.
Figure 6:
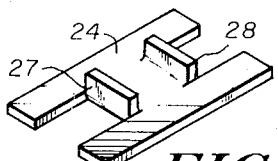
FIG. 6 is an orthographic view of the footing or anchoring member shown in FIGS. 2 and 3.

Referring to FIG. 2, an anchoring member or footing 24 for securing the support 14 to the core pipe 15 is set in the exterior surface 26 of the core pipe. The anchoring member 24 is in the form of a plate having two legs 27 and 28 bent upwardly therefrom as illustrated in FIGS. 2, 3 and 6, but it is evident that the legs may be otherwise attached. An anchoring member having legs 27' and 28' is similarly set in the other end of the pipe core.

A support member 17', similar to the support member 17, is mounted to the core pipe 15 adjacent its spigot end in the same manner as described with reference to the support member 14. The legs of the anchoring members project outwardly beyond the exterior surface 26 of the core pipe.

The support members 14 and 17' are welded to the respective pairs of upstanding legs 27, 28, and 27', 28' after a wire 29 has been helically wrapped under tension around the core pipe 15 and secured thereto at its ends by anchors, one of which is indicated at 30 in FIG. 2. As is well understood, a tensioned wire is wound around a core pipe after the core pipe has been fully cured, and the wrapping is attached at its ends to devices fastened to the core pipe.

As the wire wrapping is applied the wire is wound helically over the longitudinal expanse of the plate 24 with the legs 27, 28, projecting between turns of the wrapping. The anchorage is thereby securely locked in place to the core pipe. As is customary, the wire wrapping is protected by a coating 31 of mortar or concrete. The legs 27 and 28 of the plate are of sufficient length to extend through the thickness of the protective coating 31.

After the wire has been laid and anchored in place, the turns or coils of the wire wrapping between the legs 27 and 28 are covered with mortar or an epoxy material which also forms a pad 32 under the support 14.

The bracket 13 has a lug 33 which engages in a transverse groove in the support 14. As shown in FIG. 2, a wedge 34 is provided to prevent disengagement of the lug 33 and the bracket from the support 14, but in lieu thereof the groove may be filled with hardenable cementitious material to serve the same purpose. A cementitious epoxy material is placed to form a pad 35 beneath the overhanging ledge of the bracket 13.

The bracket 16 is similarly assembled to the support 17, FIG. 1, and a like bracket is assembled in like fashion to the support 17' whenever a joint is to be made with another pipe section.

In the foregoing, a detailed explanation has been given with respect to the bolt-restraining member and anchoring means shown in FIG. 2, and it is to be understood that a like member, as shown at 16 in FIG. 1, is mounted to similar anchoring means at the spigot end of the core pipe.

After the flare or mouth of the bell of a pipe section has been placed around the spigot of an installed pipe section, a bolt 12 is run through each pair of aligned brackets, and by taking up on a nut 36 the joint is drawn home. By backing each nut a few turns flexibility of a closed joint is assured.

Figure 4:
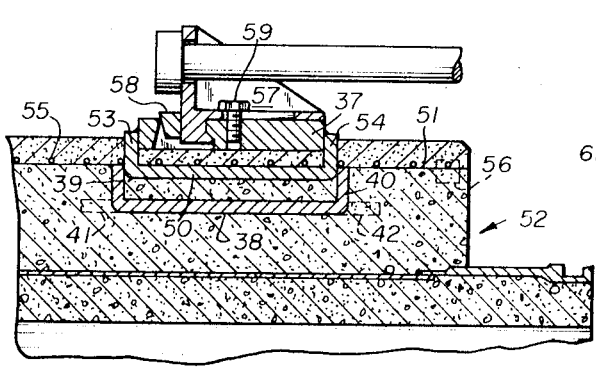
FIG. 4 is a longitudinal sectional view of a modified form of a draw bolt-supporting device.

A modified construction for anchoring a support is illustrated in FIG. 4. In this case the anchoring means for a slotted support member 37 comprises a plate member 38 which has outwardly extending legs 39 and 40 and fingers 41 and 42 extending from the central body portion of the plate member. This plate member 38 forms a footing which is completely encased in the concrete of the core pipe when the core pipe is cast. A U-shape saddle 50 is seated in a recess in the exterior surface 51 of the core pipe 52 so that its legs 53 and 54 extend radially outwardly outside of the core pipe surface 51. The saddle is welded to the legs 39 and 40.

In the manner explained hereinabove, a tensioned wire 55 is helically applied around the core pipe 52 and made to traverse over the central part of the saddle member 50 as a continuous wire wrapping from the bell end of the pipe section to the spigot end at the anchor 56. The support member 37 is welded to the legs of the saddle member 50.

A bolt-sustaining bracket 57 is removably attached to the support member 37 and may be made secure thereto by either a wedge 58 or a bolt 59, or by both. In any case the bracket need not be mounted before the pipe section has been readied for joining.

Figure 5:
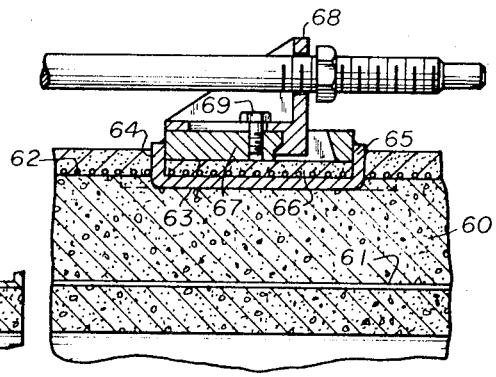
FIG. 5 is a longitudinal sectional view of still another modified form of a draw bolt-supporting device.

The modified form of the invention illustrated in FIG. 5 is shown as embodied in a prestressed concrete pipe 60 having prestressed longitudinal wires 61 in the wall of the pipe and a prestressed wire wrapping 62. In this embodiment the anchoring plate 63 is mounted and secured in place in the manner described with reference to the anchoring plate 24 of FIG. 2. After the wire wrapping 62 has been applied the coils of the wire wrapping between the legs 64 and 65 are covered by a protective coating 66. A slotted support plate 67 for a bracket 68 is mounted between the legs 64 and 65 to which it is welded. A bolt 69 is provided for securing the bracket 68 to the support plate 67. The support plate 67 completely underlies the bracket 68.

While the principle of the invention and preferred manners of putting it into practice have been described hereinbefore, it will be evident to those skilled in the art that various alterations and substitutions may be made without departing from the substance of the invention, which is intended to be defined in the following claims.

What is claimed is:

1. A prestressed concrete pipe section comprising a concrete core pipe having joint-forming ends, a helically wound tensioned wire wrapping around the exterior surface of the core pipe, protective coating material covering said exterior surface and said wire wrapping, means for restraining axial separation of a joint with another pipe section, said restraining means comprising means for anchoring draw bolt supporting means to said pipe section, said anchoring means having a base portion with an expanse longitudinally of said core pipe greater than the pitch of said wire wrapping, said base portion located inside of the inner circumference of said wire wrapping in engagement with said core pipe, and means attached to said base portion and projecting radially outwardly therefrom between coils of said wire wrapping for engagement with draw bolt supporting means outside of the outer circumference of said wire wrapping, whereby the wire of said wire wrapping is continuous between and from beyond the opposite extremities of the longitudinal expanse of said base portion.

2. A pipe section according to claim 1 wherein said portion of said anchoring means is disposed in a recess in the exterior surface of said core pipe and held fast by coils of said wire wrapping.

3. A pipe section according to claim 1 wherein said anchoring means comprise a plate member having legs extending outwardly therefrom to form a cradle for engaging bolt-supporting means, said plate member disposed at the outer periphery of said core pipe and said wire wrapping traversing the outer surface of said plate member.

4. A pipe section according to claim 1 wherein said portion of said anchoring means comprises a U-shape cradle of which the legs of the cradle engage said bolt-supporting means, and a footing wholly contained within the concrete of said core pipe, said footing being fixedly attached to said cradle.

5. A pipe section according to claim 1 wherein said bolt-supporting means are attached to said radially outwardly projecting means.

6. A pipe section according to claim 5 wherein said projecting means extend to a height outside of the exterior surface of said core pipe substantially equal to the thickness of said protective coating material.

7. A pipe section according to claim 6 wherein a filling of hardened materials is contained over said coils of the wire wrapping between said anchoring means and said bolt-supporting means.

8. A pipe section according to claim 5 wherein said bolt-supporting means include a socket member fixed to said anchoring means, and a bracket detachably connected to said socket member.

* * * * *